United States Patent
Wang et al.

(10) Patent No.: US 8,555,613 B2
(45) Date of Patent: Oct. 15, 2013

(54) MODEL-BASED DIAGNOSTICS OF NOX SENSOR MALFUNCTION FOR SELECTIVE CATALYST REDUCTION SYSTEM

(75) Inventors: Yue-Yun Wang, Troy, MI (US); Ognyan N. Yanakiev, Canton, MI (US); Ibrahim Haskara, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 772 days.

(21) Appl. No.: 12/395,790

(22) Filed: Mar. 2, 2009

(65) Prior Publication Data

US 2010/0218487 A1  Sep. 2, 2010

(51) Int. Cl.
*F01N 3/00* (2006.01)

(52) U.S. Cl.
USPC .................... 60/276; 60/277; 60/286

(58) Field of Classification Search
USPC ............ 60/277, 276, 286; 123/674, 688, 494, 123/672
See application file for complete search history.

(56) References Cited

U.S. PATENT DOCUMENTS

| | | | |
|---|---|---|---|
| 6,899,093 B2 * | 5/2005 | Center | 123/681 |
| 6,925,796 B2 | 8/2005 | Nieuwstadt et al. | |
| 2005/0103000 A1 * | 5/2005 | Nieuwstadt et al. | 60/286 |
| 2006/0242945 A1 * | 11/2006 | Wang et al. | 60/277 |
| 2007/0044457 A1 * | 3/2007 | Upadhyay et al. | 60/295 |
| 2008/0022658 A1 * | 1/2008 | Viola et al. | 60/286 |
| 2008/0103684 A1 * | 5/2008 | Allmer et al. | 701/114 |
| 2008/0271440 A1 * | 11/2008 | Xu et al. | 60/295 |
| 2009/0266059 A1 * | 10/2009 | Kesse et al. | 60/295 |

FOREIGN PATENT DOCUMENTS

| | | | |
|---|---|---|---|
| DE | 102007059888 A1 * | 1/2009 | |
| WO | 2007037730 | 4/2007 | |
| WO | WO 2007037730 A1 * | 4/2007 | |

\* cited by examiner

*Primary Examiner* — Thomas Denion
*Assistant Examiner* — Abdul Elnoubi

(57) ABSTRACT

Methods and systems for detecting faults with nitrogen oxides sensors used to detect the presence of nitrogen oxides in an exhaust effluent gas stream emitted from a combustion engine during its operation include providing a virtual nitrogen oxides sensor measurement compared with actual nitrogen oxides content measured by nitrogen oxides sensors.

11 Claims, 1 Drawing Sheet

MODEL-BASED DIAGNOSTICS OF NOX SENSOR MALFUNCTION FOR SELECTIVE CATALYST REDUCTION SYSTEM

TECHNICAL FIELD

The present disclosure generally relates to treatment of effluent gas streams from combustion processes.

BACKGROUND

The statements in this section merely provide background information related to the present disclosure and may not constitute prior art.

Modern combustion engines are known to be equipped with control systems for controlling their operation, including their performance characteristics and treatment of effluent exhaust gas streams emanating from such engines. Such control over engine operation and exhaust gas streams are made largely possible by placement of various types of sensors about the engines, which sensors have outputs that are routed as inputs to microprocessors which in turn are in operative control with various engine control means, including, inter alia, fuel delivery systems, exhaust gas recirculation systems, and air injector reactor systems.

Due to the nature of sensors in general, it sometimes occurs that one or more sensors disposed about an engine may experience an erosion in operating efficacy, degradation of performance, and even failure rendering them unusable for their intended purpose. Failure of sensors can happen while an operator is operating a motorized vehicle in which such engines are disposed and used as a motive means of power.

SUMMARY

A system useful for detecting a fault in a sensor disposed on-board a motorized vehicle having a piston-driven combustion engine with an air inlet conduit and an exhaust effluent gas conduit includes a catalyst chamber comprising a portion of the exhaust effluent gas conduit and including a solid catalyst disposed therein, the catalyst chamber having an upstream side and a downstream side. A plurality of sensors is disposed about the system, each of which is useful for sensing an operational parameter relating to the engine and including a first nitrogen oxides sensor that provides a measured content of nitrogen oxides present in the exhaust effluent gas. At least one control module is configured to receive a plurality of inputs, provide at least one output signal responsive to at least one of the inputs, and is further configured to generate a virtual nitrogen oxides sensor model based on the operational parameters. The virtual nitrogen oxides sensor model provides an estimated output of nitrogen oxides from the engine during its operation, determines a residual value based on the difference between the estimated output and the measured content, determines conversion efficiency of the solid catalyst, and monitors the residual value and the conversion efficiency during operation of the engine.

BRIEF DESCRIPTION OF THE DRAWINGS

One or more embodiments will now be described, by way of example, with reference to the accompanying drawings, in which.

DETAILED DESCRIPTION

Figure 1:
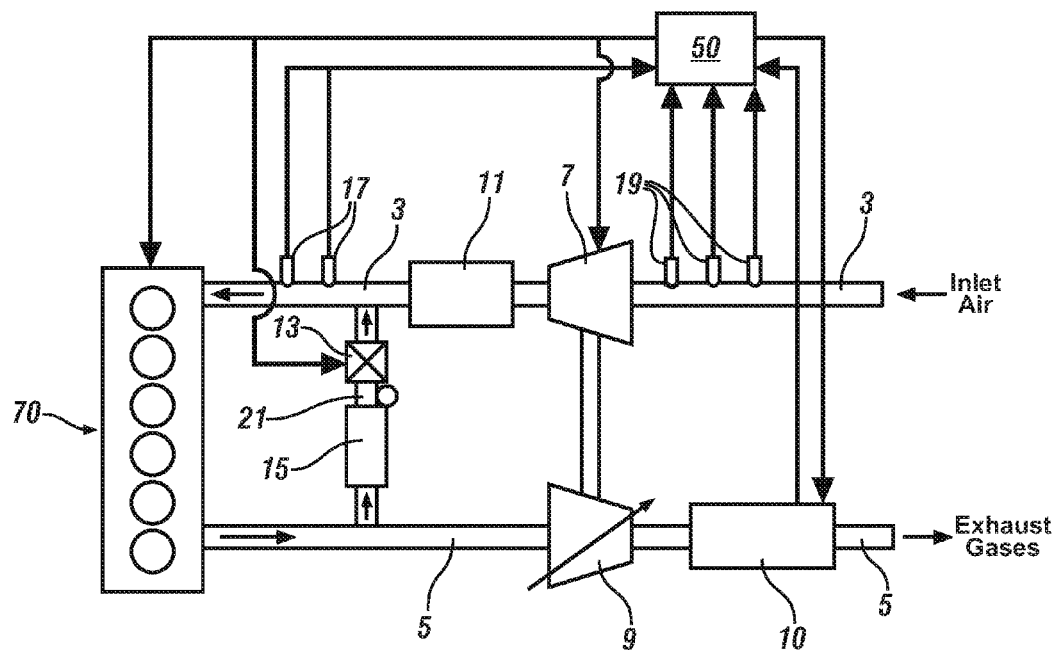
FIG. 1 is a schematic view of a combustion engine and accessories associated with its operation, in accordance with the present disclosure.

Referring now to the drawings, which are provided for the purpose of illustrating exemplary embodiments only and not for the purpose of limiting the same, FIG. 1 shows a schematic view of a combustion engine 70 comprising pistons and cylinders, and accessories associated with its operation, according to one embodiment of the disclosure. The combustion engine may be either a spark-ignition engine or a compression-ignition engine, and in preferred embodiments is piston-driven. An air inlet conduit 3 passes ambient air on its way to one or more engine cylinders. An exhaust gas conduit 5 passes exhaust gases from the combustion engine 70 when expelled during its normal operation. In some embodiments, a compressor 7 is provided to compress the inlet air, thus increasing its density to provide a higher concentration of oxygen in the air fed to the engine. The compressor 7 may be shaft-driven by a turbine 9 that is disposed in the exhaust gas conduit, as is known in the art of turbo charging. In one embodiment, recirculation of exhaust gases is effected by means of a selectively-actuable valve 13 disposed in a conduit 21 provided between the air inlet conduit 3 and the exhaust gas conduit 5. In such embodiments, a cooler 15 is preferably provided to reduce the temperature of the re-circulated exhaust gases prior to their being mixed with air being admitted through the air inlet conduit 3. A compressed air cooler 11 is preferably provided on the high-pressure side of compressor 7, when present, to dissipate some of the heat resulting from compression of the inlet air. In preferred embodiments, an aftertreatment system 10 is disposed between an exhaust manifold of the engine 70 and the point on the exhaust gas conduit 5 at which exhaust gases are released to the atmosphere. In one embodiment, the aftertreatment system 10 includes an oxidation catalyst, a particulates filter, and a nitrogen oxides ("NOx") selective catalytic reduction system ("SCR"). While the various components described above are depicted in schematic view, it is appreciated by those having ordinary skill in the art that many of the elements described, including the air inlet conduit and exhaust gas conduit, may be provided by integral castings, such as intake and exhaust manifolds which comprise one or more of such components, to the extent that such configurations are generally known in the art. In one embodiment, the engine 70 is a compression-ignition engine, operating using diesel fractions, oils, or esters such as "biodiesel" as fuel. In another embodiment, the engine 70 is a spark-ignition engine, operated using gasoline, ethanol, mixtures thereof, or other normally-liquid hydrocarbons and oxygenates as fuel.

Operation of engine 70 may be beneficially controlled by providing sensors 17 and sensors 19 at the depicted general locations along the air inlet conduit 3 shown in FIG. 1. Suitable as sensors 17 include without limitation such sensors as air inlet pressure and temperature sensors, which are useful to measure intake manifold temperature and pressure. Suitable as sensors 19 include without limitation such sensors as mass airflow rate sensors, ambient air temperature sensors, and ambient air pressure sensors. In preferred embodiments, the various sensors present provide inputs to at least one control module 50 operatively connected to various devices useful for controlling combustion and engine operation, including without limitation compressor boost pressure, exhaust gas recirculation, dosing of a reductant into an exhaust effluent stream, and in some cases, valve timing.

The at least one control module 50 is preferably a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the desired functions.

The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event such as a specific crank angle location.

Figure 2:
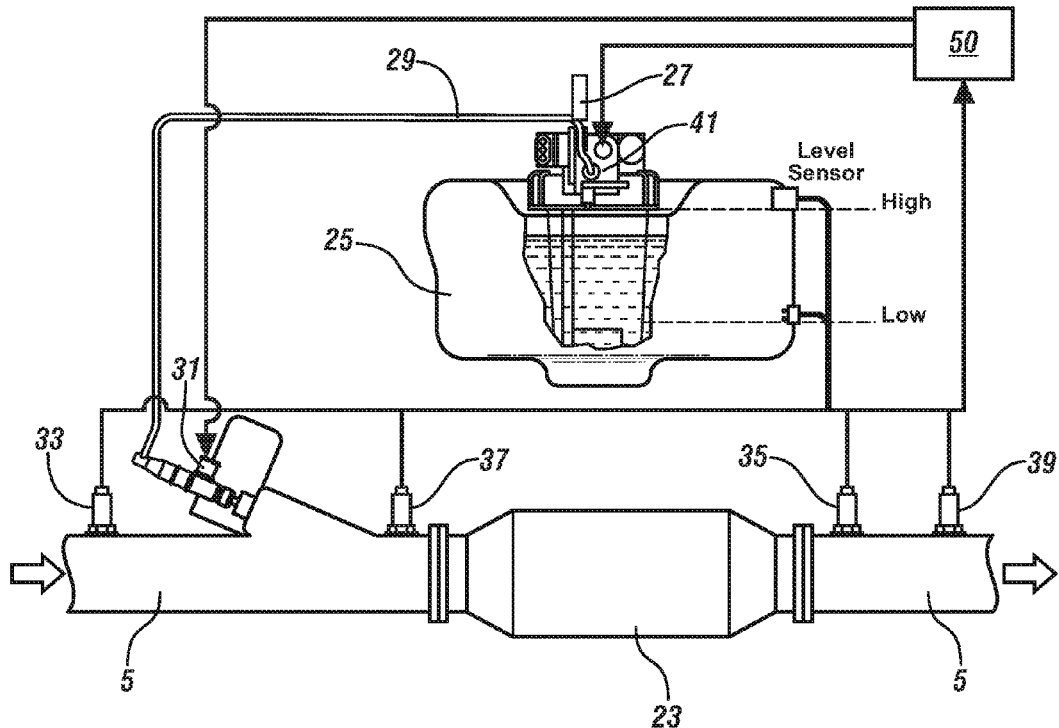
FIG. 2 shows a component system of an aftertreatment system accessory, in accordance with the present disclosure.

FIG. 2 shows a component system of an aftertreatment system 10 according to one embodiment of the disclosure. FIG. 2 shows an exhaust gas conduit 5 having a catalyst chamber 23 disposed as a segment along its length, the catalyst chamber 23 containing a reduction catalyst in either the form of a catalyst bed or monolithic material through which engine exhaust gases are caused to pass, in the direction indicated by arrows. An electronically-actuable dispenser 31 (of any type useful for controllably dispensing a liquid reductant from a conduit line within which a liquid reductant is maintained under pressure) is provided to the exhaust gas conduit 5 on the upstream side of catalyst chamber 23, to cause admixture of an administered liquid reductant with the flowing exhaust gases contained within exhaust gas conduit 5. In one embodiment the dispenser 31 is a solenoid-controlled valve. In a preferred embodiment, the liquid administered through dispenser 31 is contained within tank 25 and conveyed from tank 25 to dispenser 31 via conduit line 29, using pump 41 and line pressure sensor 27 to maintain the liquid pressure in conduit line 29 at a selected pressure, which may be any pressure between about 15 psig and about 150 psig, including all pressures and ranges of pressures therebetween. For convenience, tank 25 is provided with a level sensor.

Also shown in FIG. 2 are sensors 33, 35, which in a preferred embodiment are NOx sensors. NOx sensor 33 is disposed so its sensing element is in effective sensing contact with gases present in the exhaust gas conduit 5 on the upstream side of the catalyst chamber 23. NOx sensor 35 is disposed so its sensing element is in effective sensing contact with gases present in the exhaust gas conduit 5 on the downstream side of the catalyst chamber 23.

In a preferred embodiment there are also provided sensors 37, 39 which are temperature sensors. Temperature sensor 37 is disposed so its sensing element is in effective sensing contact with gases present in the exhaust gas conduit 5 on the upstream side of the catalyst chamber 23, and temperature sensor 39 is disposed so its sensing element is in effective sensing contact with gases present in the exhaust gas conduit 5 on the downstream side of the catalyst chamber 23. In preferred embodiments, the liquid contained in tank 25 and administered by dispenser 31 into the exhaust gas stream comprises a "liquid reductant", which is a substance capable of reducing nitrogen oxides present in the exhaust gas stream after they have emerged from engine 70 (FIG. 1). The reduction preferably occurs on the surface of a catalyst disposed in the catalyst chamber 23.

In one embodiment, the liquid reductant contained in tank 25 comprises an aqueous solution of urea. However, liquid compositions comprising other reductants, organic and inorganic, known in the art for reducing the nitrogen oxides content in the effluent exhaust gas stream from a combustion engine are useful as well. Such alternatives may comprise one or more materials whose molecular structure includes at least one nitrogen atom having at least one hydrogen atom attached to the nitrogen atom, including urea itself and organic-substituted ureas (collectively "a urea").

During one mode of operation of a combustion engine 70 shown and described in relation to FIG. 1 having accessories including the component system shown and described in relation to FIG. 2, the NOx sensors 33, 35 and the temperature sensors 37, 39 have outputs which are provided as inputs to the at least one control module 50. This provides control of the operation of dispenser 31, to dispense effective nitrogen oxides reducing amounts of liquid from tank 25 into the exhaust gases present in the exhaust gas conduit 5 on the upstream side of the catalyst chamber 23, so as to reduce the amount of NOx present in the exhaust gases being so treated to a predetermined level. The quantities of NOx present in the exhaust gas conduit 5 both upstream and downstream of the catalyst chamber are derived from sensors 33, 35 and these quantities can be readily mathematically manipulated in the at least one control module 50 to determine, among other things, the difference in NOx content of an effluent gas generated by engine 70 both prior to and after treatment with a liquid reductant contained in tank 25, on a catalytic surface present in chamber 23.

NOx sensors may exhibit a gradual degradation of performance over time. In one possible scenario, sensor 33 may provide an output indicative of a lower-than-actual amount of NOx present in the effluent gas stream on the downside of catalyst chamber 23. When the various sensors present are operatively connected to the at least one control module 50 which controls dispensation of liquid from tank 25 through dispenser 31 responsive at least in part on inputs including information from sensors 33 and 35, a falsely-low indication of NOx content in the gases present at sensor 33 may cause less of the liquid from tank 25 to be dispensed, than ought otherwise be dispensed in order to maintain the NOx below a pre-selected level.

According to one embodiment of this disclosure, a model-based approach is used to detect a fault in a NOx sensor. In this embodiment, a virtual NOx sensor is modeled as a function of engine operational parameters using a plurality of data inputs comprising two or more parameters selected from the group consisting of: rate of exhaust gas recirculation ("EGR-rate"); crankshaft angle at which any selected percentage of the fuel in the combustion chamber has been burned ("CAXX", wherein XX represents the percentage of fuel burned); average combustion temperature within an engine's cylinders ("Tburn"); average maximum pressure achieved in the combustion chambers of an engine ("Pmax"); crankshaft position measured in degrees at which peak cylinder pressure is developed ("θ max"); air/fuel ratio ("AFR"); rate of fuel delivery ("fuelrate"); start of injection angle ("SOI") for compression ignition engines, which is the angle, measured in degrees of crankshaft rotation, at which injection of fuel into a cylinder begins; humidity of air entering the engine's cylinders; and intake manifold temperature ("IMT").

One model-based approach for providing a virtual NOx sensor according to an embodiment hereof employs sensors disposed about an engine to build a non-linear model to estimate the NOx content of the effluent gas stream from the engine. In general terms, the model may be expressed mathematically as follows.

$$NOx = f(x1, x2, x3, \ldots x_n) \quad (1)$$

The model may be expressed more dynamically in differential form as follows.

$$\frac{dNOx}{dt} = f(NOx, x1, x2, \ldots xn) \quad [2]$$

In one non-limiting example, $$\frac{dNOx}{dt} = f(NOx, EGRrate, AFR, fuelrate, SOI, IMT). \quad [3]$$

And in another non-limiting example, $$\frac{dNOx}{dt} = f(NOx, EGRrate, AFR, CA50, Tburn). \quad [4]$$

In yet a third non-limiting example, $$\frac{dNOx}{dt} = f(NOx, EGRrate, AFR, CA50, Pmax, \theta max). \quad [5]$$

Various functions may be employed in providing estimates of NOx content of exhaust gas stream NOx content, based on inputs from sensors disposed on the engine itself, or in effective sensing contact with a portion of one or more of its accessories.

Once a function has been selected for a non-linear model of estimating NOx present in an engine's exhaust effluent gases, the actual NOx content of the effluent gases of the same engine may be measured, using an on-board NOx sensor (such as NOx sensors 33, 35) and a residual value, r, may be generated by taking the difference between a measured NOx value and an estimated NOx value generated by the virtual NOx sensor as follows.

$$r = NOx(\text{measured}) - NOx(\text{estimated}) \quad (6)$$

In one embodiment, this residual value r is monitored over time by the at least one control module 50 that has the function for the virtual sensor embedded in it, and to which a NOx sensor 33 (FIG. 2) output is provided as an input.

According to one embodiment, during operation of an engine 70 having accessories as herein described, the efficiency $\eta$ of the catalytic reduction of NOx in the effluent gas stream is monitored, by the control module. When the efficiency $\eta$ of the catalytic reduction of NOx in the effluent gas stream taking place drops below particular thresholds $\epsilon_1$ and $\epsilon_2$, whose values are dictated by the user or vehicle engineers, that is, when $$\eta = 1 - \frac{NOx(\text{measured catalyst outlet})}{NOx(\text{measured catalyst inlet})} < \varepsilon_1 \quad [7]$$

and $$\eta = 1 - \frac{NOx(\text{measured catalyst outlet})}{NOx(\text{estimated catalyst inlet})} < \varepsilon_2 \quad [8]$$

a method provided herein causes the residual value r to be observed. For cases where the residual value r is significantly less than zero, by an amount prescribed by the user or vehicle engineers, and if the catalyst NOx conversion efficiency drops to a predetermined level which unacceptably affects engine exhaust emissions, the control module provides an output signal indicating a potential in-range low fault condition. Responsive to this condition in this embodiment, the control module commands an increased dosing amount of reductant from tank 25 via dispenser 31 based on the virtual NOx amount, and catalyst conversion efficiency is once again evaluated. If the catalyst NOx conversion efficiency subsequently recovers (using the estimated NOx in the efficiency computation) to then be within a typical operating range after such increased dosing amount is administered, a fault in the NOx sensor is diagnosed and an alarm may be optionally outputted from the control module to the operator of the engine or otherwise recorded or used as a signal.

Another embodiment of this disclosure is useful for detecting NOx sensor faults under cold-start conditions of a piston-driven combustion engine equipped with an NOx reductant dosing system and catalyst as herein described, i.e., when the engine is being started after its having been permitted to achieve substantial thermal equilibrium with its ambient surroundings. Under cold start conditions, the dosing of a reductant contained in a tank 25 as shown and described in relation to FIG. 2 is not activated. Accordingly, since the catalyst contained in catalyst chamber 23 has essentially no NOx reduction capabilities in the absence of the liquid reductant, the levels of NOx detected at locations of sensors 33 and 35 (or equivalently, their direct outputs) will be approximately equal. Typically, the NOx sensors 33, 35 take about one minute to be warmed to their operating temperature, and after operating an engine about one minute the temperature of the catalyst present in catalyst chamber 23 is less than about 200° Centigrade. Under these conditions, the residual value r representing the difference in NOx concentration on the upstream side of catalyst chamber 23 as measured by sensor 33 and the NOx concentration on the downstream side of catalyst chamber 23 as measured by sensor 35 (or equivalently, their direct outputs) should be about zero if both NOx sensors are functioning properly. According to one embodiment of the disclosure, the outputs of the sensors 33, 35 are monitored under these conditions for differences against a pre-selected criteria, which in one embodiment is a pre-selected numerical value, in one embodiment being about zero. In the event that the residual difference in the values provided by sensors 33, 35 under cold start conditions after the sensors have reached operating temperature but before reductant dosing has been initiated is greater than a pre-selected criteria, an error condition is indicated.

The outputs of NOx sensors are referred to in this disclosure but it shall be understood that the outputs of such sensors may be in millivolts, ohms, or may be expressed in terms of nitrogen oxides content on a mass percent basis, volume percent basis or other basis. These outputs are generally readily convertible between, for example, millivolts and weight percent nitrogen oxides, using methods known in the art.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A system useful for detecting a fault in a sensor disposed on-board a motorized vehicle having a piston-driven combustion engine with an air inlet conduit and an exhaust effluent gas conduit, comprising:
   a catalyst chamber comprising a portion of said exhaust effluent gas conduit and including a solid catalyst disposed therein, said catalyst chamber having an upstream side and a downstream side;
   a plurality of sensors disposed about said system, each of said sensors useful for sensing an operational parameter relating to said engine, said plurality including a first nitrogen oxides sensor that provides an upstream measured content of nitrogen oxides present in the exhaust effluent gas on the upstream side of said catalyst chamber;
   a second nitrogen oxides sensor that provides a downstream measured content of nitrogen oxides present in the exhaust effluent gas on the downstream side of said catalyst chamber;
   at least one control including a control algorithm, comprising resident program instructions and calibrations stored in the non-volatile memory and executed to provide the following functions, and module, configured to receive a plurality of inputs and provide at least one output signal responsive to at least one of said inputs, the at least one control module
   generating a virtual nitrogen oxides sensor comprising a non-linear model expressed dynamically in differential form based on a function of two or more of said operational parameters, said virtual nitrogen oxides sensor comprising the non-linear model expressed dynamically in differential form providing an estimated output of nitrogen oxides from said engine during its operation,
   determining a residual value based on the difference between said estimated output and said upstream measured content,
   determining conversion efficiency of said solid catalyst based on the downstream measured content divided by the upstream measured content, and
   the downstream measured content divided by the estimated output of nitrogen oxides from said engine during its operation,
   comparing the downstream measured content divided by the upstream measured content to a first predetermined numerical value of conversion efficiency,
   comparing the downstream measured content divided by the estimated output of nitrogen oxides form said engine during its operation to a second predetermined numerical value of conversion efficiency,
   monitoring said conversion efficiency during operation of said engine, and
   monitoring said residual value during operation of the engine in response to the downstream measured content divided by the upstream measured content is less than the first predetermined numerical value of conversion efficiency and the downstream measured content divided by the estimated output of nitrogen oxides from said engine during its operation is less than the second predetermined numerical value of conversion efficiency.

2. A system according to claim 1, further comprising:
   a dispenser operatively connected to said at least one output of said at least one control module and effectively positioned to administer a liquid reductant into the exhaust effluent gas on the upstream side of said solid catalyst during engine operation, responsive to changes in said residual value and said conversion efficiency.

3. A system according to claim 2 wherein said at least one control module further comprises:
   comparing said residual value to a predetermined numerical value of residual value.

4. A system according to claim 3, wherein said at least one control module is configured to provide at least one output signal that comprises an indication of a fault with said first nitrogen oxides sensor.

5. A system according to claim 4 wherein said indication of a fault is generated when said residual value is less than said predetermined numerical value of residual value and the downstream measured content divided by the upstream measured content falls below the first predetermined numerical value of conversion efficiency and the downstream measured content divided by the estimated output of nitrogen oxides from said engine during its operation falls below the second predetermined numerical value of conversion efficiency.

6. A system according to claim 1, wherein said reductant comprises a urea.

7. A system according to claim 1 wherein said operational parameters include at least one parameter selected from the group consisting of: a nitrogen oxides content of the exhaust effluent gas; a rate of exhaust effluent gas recirculation; a crankshaft angle at which 50% of a fuel in a combustion chamber of the engine has been burned;
   an average combustion temperature in a combustion chamber of the engine; an average maximum pressure achieved in a combustion chamber of the engine; a crankshaft position measured in degrees at which a peak cylinder pressure is developed; an air/fuel ratio; a rate of fuel delivery; a start of injection angle; a humidity of air entering a combustion chamber of the engine; and an intake manifold temperature.

8. A process for determining a fault in a first sensor that measures nitrogen oxides in an exhaust effluent gas stream on an upstream side of a catalyst chamber from a combustion engine having an exhaust effluent gas conduit that includes the catalyst chamber and a solid catalyst disposed therein, a second sensor that measures nitrogen oxides in the exhaust effluent gas on a downstream side of said catalyst chamber and a dispenser effectively positioned to administer a liquid reductant into said exhaust effluent gas stream, the process comprising:
   administering the liquid reductant to said exhaust effluent gas stream at a first rate;
   generating a virtual nitrogen oxides sensor model based on operational parameters associated with said engine during its operation, said virtual nitrogen oxides sensor model providing an estimated output of nitrogen oxides from said engine;
   measuring the actual nitrogen oxides content of the exhaust effluent gas stream on the upstream side of said catalyst generated by said engine during its operation;
   measuring the actual nitrogen oxides content of the exhaust effluent gas stream on the downstream side of said catalyst generated by said engine during its operation;
   determining a residual value based on the difference between said estimated output and said actual nitrogen oxides content on the upstream side of said catalyst;
   determining a conversion efficiency of said solid catalyst based on the actual nitrogen oxides content on the downstream side of said catalyst divided by the actual nitrogen oxides content on the upstream side of said catalyst, and the actual nitrogen oxides content on the downstream side of said catalyst divided by the estimated output of nitrogen oxides from said engine;

comparing actual nitrogen oxides content on the downstream side of said catalyst divided by the actual nitrogen oxides content on the upstream side of said catalyst to a first predetermined numerical value of conversion efficiency, comparing the actual nitrogen oxides content on the downstream side of said catalyst divided by the estimated output of nitrogen oxides from said engine to a second predetermined numerical value of conversion efficiency, monitoring said conversion efficiency during operation of said engine;

monitoring said residual value during operation of the engine in response to the downstream measured content divided by the upstream measured content is less than the first predetermined numerical value of conversion efficiency and the downstream measured content divided by the estimated output of nitrogen oxides from said engine during its operation is less than the second predetermined numerical value of conversion efficiency;

comparing said residual value to a predetermined numerical value of residual value; and making a determination that a potential fault exists in the event that said residual value is less than said predetermined numerical value of residual value and value is less than said predetermined numerical value of residual value and the downstream measured content divided by the upstream measured content remains less than the first predetermined numerical value of conversion efficiency and the downstream measured content divided by the estimated output of nitrogen oxides from said engine during its operation remains less than the second predetermined numerical value of conversion efficiency.

9. A process according to claim 8, further comprising:
subsequent to said making a determination that a potential fault exists, administering said liquid reductant at a second rate;
determining said conversion efficiency subsequent to administering said liquid reductant at the second rate;
comparing said conversion efficiency determined during administering said liquid reductant at said first rate to conversion efficiency determined during administering said liquid reductant at said second rate.

10. A process according to claim 9, further comprising:
making a determination that a fault exists in said sensor in the event that said conversion efficiency after said second rate of administering increases to be substantially the same as the conversion efficiency determined when administering said reductant at said first rate.

11. A process according to claim 9 wherein said second rate of administering said reductant is greater than said first rate of administering said reductant.

* * * * *